July 13, 1965 O. H. BANKER 3,194,401
FUEL FILTER
Filed Oct. 6, 1961 2 Sheets-Sheet 2
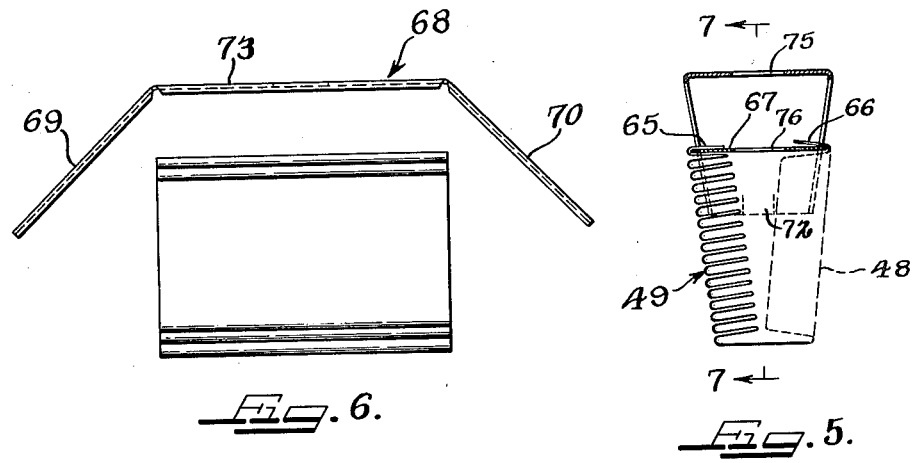
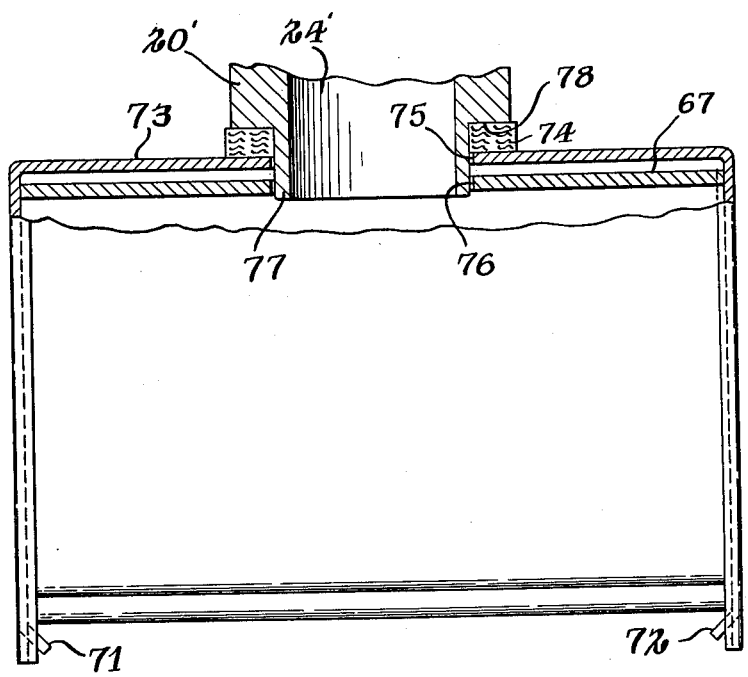
INVENTOR
OSCAR H. BANKER United States Patent Office 3,194,401
Patented July 13, 1965

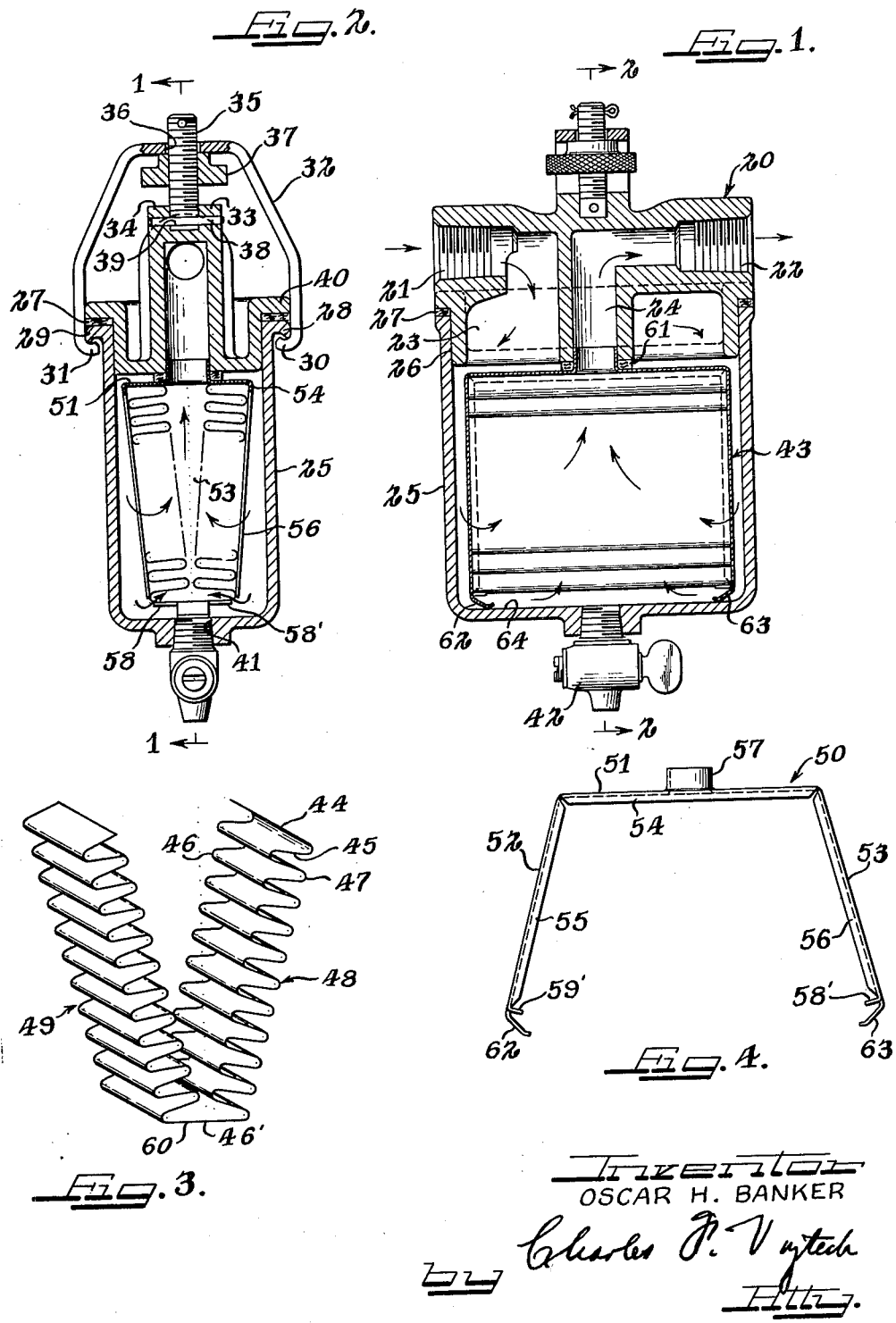

3,194,401
FUEL FILTER
Oscar H. Banker, % Bay Products Development Co.,
P.O. Box 9732, Bay Village, Ohio
Filed Oct. 6, 1961, Ser. No. 146,071
7 Claims. (Cl. 210—444)

This invention relates to filters for fluids, such as gasoline, oil and other fuels used in internal combustion engines.

The principal object of this invention is to provide a filter for fuel which is more efficient than those presently available, and is inexpensive and easy to construct.

Another object of this invention is the provision of a filter for fuel or other fluids wherein the filter element is readily replaceable without the necessity of disconnecting and reconnecting fuel lines.

A further object of this invention is the provision of a filter assembly including a housing and a bowl attachable thereto, wherein the bowl can be removed without spilling the fluid to be filtered, even though the fuel line leading to the housing, as well as the housing, may contain some fuel.

These and other objects and features of this invention will become apparent from the following detailed description of certain illustrative embodiments when taken together with the accompanying drawings, in which:

FIG. 1 is a front elevation in section of a fuel filter incorporating the features of this invention;

FIG. 2 is a side elevational view in section of the filter of FIG. 1, the section being taken along line 2—2 of FIG. 1;

FIG. 3 is an elevational view in perspective on an enlarged scale of the principal component of the filter element shown in FIGS. 1 and 2;

FIG. 4 is a front elevational view of a second component of the filter element shown in its state prior to assembly with the first component;

FIG. 5 is a side elevational view of a modification of the filter element of FIGS. 1 and 2 shown in an intermediate stage of construction;

FIG. 6 is an exploded front elevational view of the filter element of FIG. 5 in a more advanced state of completion; and FIG. 7 is an enlarged front elevational view, partly in section, of the modification of FIG. 5 in completed form showing the manner in which it is assembled with respect to the outlet passage for the filter device.

Filters for fluids such as gasoline and other combustible substances are usually of the "in line" variety and are inserted in the conduit which brings the fluid from a supply tank to the carburetor or injection nozzle of the internal combustion engine. A very common type of filter element, that is, the portion of the filter device through which the fluid must pass and by which it is strained, is a porous sheet material, frequently a form of paper, which has been folded into a continuous series of uniform pleats resembling accordion pleats. The filter element is wrapped around a cylindrical screen, the ends of the folds are sealed and the exterior of the element is exposed to the incoming fluid to be strained.

When the folds are wrapped around a cylindrical screen, they then extend substantially radially outwardly from the screen, and the spacing between the apices of the folds immediately adjacent the screen is considerably less than the spacing between the apices of the folds disposed around the outside of the filter element. This means that the effective filtering area provided by the element has been materially reduced, and if the element is made of a relatively soft fibrous material such as paper, fibers at the inner apices are compressed together more than those at the outside of the element, which then results in a restriction of the flow of fluid through the filter element.

The present invention seeks to eliminate the differential in spacing between apices of a folded filter element as between the opposite sides of the element to take full advantage of the available filtering area, and thus to make possible an increase in the efficiency of a given sized filter element. It also seeks to eleminate the difference in density of the filter material as between the opposite sides of a folded filter element. Both of these desirable objectives are attained in the present invention by forming the filter element from a sheet of accordion folded porous filter material in such manner that apices of the folds all lie on a substantially flat plane.

Referring now to FIG. 1, for an illustration of a preferred embodiment of the invention, the filter is comprised of a die-cast body 20, which has axially aligned inlet and outlet openings 21 and 22, respectively, threaded to receive appropriate fittings for connection to pipes leading to a source of supply on one hand and to a carburetor or fuel injection system on the other hand. Inlet opening 21 communicates directly with inlet chamber 23, which extends around an outlet chamber 24 communicating with the outlet opening 22. Both the inlet and outlet chambers are open at the bottom for the free flow of fluid out of or into the chambers, as the case may be. Chamber 24, however, is centrally disposed with respect to housing 20, and is, in the form shown in FIG. 1, of circular cross-section.

A bowl 25 made of glass or other transparent material is fitted around the outer surface 26 of the housing 20 defining chamber 23, and is sealed with respect to said housing 20 by a gasket 27. Bowl 25 is generally rectangular in horizontal cross-section, as viewed in FIG. 1, and is formed with outwardly extending lips 28, 29 on the long sides thereof with which cooperate the hooked ends 30 and 31 of a U-shaped clamp 32.

The upper central region of housing 20 is formed with spaced ears 33, 34 between which is received the lower end of a threaded pin 35 which extends upwardly as viewed in FIGS. 1 and 2 through a suitable opening 36 formed in clamp 32. A thumb screw 37 is threaded on pin 35, and is disposed between ears 33, 34 and clamp 32. A pin 38 passes through ears 33, 34 and through an appropriate opening 39 in the lower end of threaded pin 35 to anchor said end to housing 20.

Housing 20 is formed with a flange 40 extending around the mid-section thereof, against which gasket 27 may be pressed into sealing engagement by clamp 32 and the lips 28, 29 on bowl 25.

The clamping action by which bowl 25 is held in sealing engagement, through gasket 27, against housing 20 is provided by thumb screw 37 which when turned on its threaded pin 35 in a direction to cause it to rise, as viewed in FIGS. 1 and 2, into engagement with clamp 32, causes said clamp 32 to pull upwardly, through its hooks 30 and 31, upon the lips 28 and 29 of bowl 25, which in turn urges said lips firmly against gasket 27 and said gasket against flange 40. When it is desired to remove bowl 25, thumb screw 37 is turned in the opposite direction so that it is made to descend along threaded pin 35 until hooks 30 and 31 of clamp 32 are free of the lips 28, 29 on bowl 25. Clamp 32 is then sprung to separate the hooks 30 and 31 until bowl 25 can be lowered past the hooks and separated from housing 20.

If desired, the bottom regions of bowl 25 may be made to drain toward an opening 41 which is threaded to receive a petcock or drain valve 42.

Inasmuch as inlet chamber 23 and outlet chamber 24 are open to the interior of bowl 25, direct communication between these two chambers must blocked by a filter element to make certain that no unfiltered fluid passes into outlet opening 22. The filter element is shown generally at 43, and the essential parts thereof are shown in FIGS. 3 and 4.

Referring first to FIG. 3, the novel filter element is comprised of a strip of porous flexible filter material of known composition 44, which has been folded back and forth upon itself to form accordion-type folds 45 extending across the short dimension of the strip 44. Said folds are prefarebly made uniform and parallel to one another and form series of apices 46 on one side of the strip and 47 on the other side thereof. The strip 44, after the folds 45 have been formed therein, is then folded along a central apex 46' to provide two substantially identical filter sections 48 and 49 connected together by the now opened fold which formerly formed apex 46'. It may be noted that each section 48, 49 of the filter element 43 retains its planar form such that all of the apices 46 lie in one plane and all of the apices 47 lie in another plane which is parallel to the plane of the apices 46. This means that the apices have not been distorted in any manner whatsoever, and are permitted to retain their original accordion pleat form.

The folded filter element of FIG. 3 is given rigidity and is made to form three sides of a container by a thin sheet metal closure member 50 shown in FIG. 4. The closure member 50 is formed with a planar top 51, which is substantially rectangular in form, and with attached depending sides 52 and 53 which are trapezoidal in form. Top 51 and sides 52 and 53 are formed on their free edges with flanges 54, 55 and 56, respectively, between which the strip 44 in its folded form as shown in FIG. 3 is retained. In the center of the top section 51 is formed a short tube 57, the outer diameter of which is made to fit snugly within outlet chamber 24, so that the closure member 50 may be held frictionally in chamber 24 by the tube 57.

The sides 52 and 53 are brought closer together after the folded filter strip 44 is inserted between them and lightly pressed against the top section 51. An appropriate adhesive is applied to the inner surfaces of the top 51 and sides 52 and 53 prior to assembly thereof with the filter strip 44, so that when the strip is pressed against the top 51 and the sides 52 and 53 are brought inwardly to bear against the edges of the strip 44, that is, the edges of the folds 45, said strip is firmly adhered and sealed with respect to the closure member 50. The bottom regions of the sides 52 and 53 are each formed with spaced tabs 58, 58' and 59' (FIGS. 2 and 4) which engage the bottom surface (FIG. 3) of the central region 60 of the filter strip 44. Said tabs serve to hold the filter strip in place against the natural resilience of the folds.

After the filter strip 44 is assembled with respect to the closure member 50, a relatively rigid unitary filter element 43 is formed. This filter element is preferably assembled with respect to housing 20 before the bowl 25 is applied, since it is necessary to make certain that the tube 57 is properly located within the outlet chamber 24.

The portions of the lower regions on the sides 52 and 53 disposed between the tabs 58 and 58', for example, are left somewhat elongated and are bent at angles of approximately 45° to the planes of the sides 52 and 53, respectively, to form spring fingers 62 and 63. When the filter element is assembled with respect to housing 20 and bowl 25 is placed over the filter element 43 and also assembled with respect to housing 20, fingers 62 and 63 bear against the bottom inner surface 64 of the bowl 25 and provide an upward thrust upon the filter element 43 to hold said element continuously against gasket 61.

The filter device, when completely assembled, as shown in FIGS. 1 and 2, causes a flow of fluid between the inlet opening 21 and outlet opening 22 which follows the arrows shown in these figures. It may be noted that the fluid, upon leaving inlet chamber 23, strikes the metal top section 51 of the closure member 50 so that the filter element is protected from erosion produced by the fluid by the metal closure member. The fluid may flow around the outlet chamber 24 into bowl 25 and then through the filter sections 48 and 49 to the space between said sections, from which it then leaves the filter element through the tube 57, outlet chamber 24 and outlet opening 22. As stated previously, the original uniform spacing of the folds is retained in the foregoing filter element construction so that the efficiency of the filter material remains at a maximum after the element is formed. The adhesion between the filter material and the closure member 50 at the edges of the folds causes said folds to retain their specific form regardless of any variations in internal pressure within the element that may occur as a result of the operation of the associated internal combustion engine.

It may be observed that the filter element 43 requires the formation of a tube 57 in the metal closure member which adds somewhat to the cost of the said member. Said tube may be eliminated by the construction shown in FIGS. 5, 6 and 7. In this latter form the filter strip is folded in the same manner as shown in FIG. 3, but the upper ends are first folded over a rectangular rigid insert 67, preferably made of thin sheet metal, and said ends 65, 66 are then secured to the top surface of insert 67 by an appropriate adhesive. The closure member 68 is flanged in the manner shown in FIG. 4 with reference to closure member 50, and is then placed over the three open sides of the filter element and particularly over the ends 65 and 66, to which it is secured by an adhesive. The edges of the folds are similarly adhered to the sides 69 and 70 of the closure member, and tabs 71 and 72 are bent inwardly under the filter strip as shown in FIG. 7 to provide an upward thrust to assist in holding the strip against the top section 73 of the closure member 68.

Both top section 73 and the insert 67 have openings 75 and 76 stamped thereinto, respectively, into which may be inserted a tubular extension 77, die-formed on the end of the outlet chamber 24' of a housing 20' which is otherwise similar in construction to that shown in FIGS. 1 and 2. A resilient gasket 74 is inserted between the top section 73 and a shoulder 78 on housing 20', and serves to maintain a fluid tight seal between the closure member 68 and the outlet chamber 24'. Because of the resilience of gasket 74, the spring fingers at the bottom of the filter element of FIG. 7, which would normally act against the upper surface of the bottom wall 64 of the bowl 25 to provide an upper thrust, may be dispensed with.

The filter element of the FIG. 7 form functions in the same manner as the one disclosed in FIGS. 1 to 4 inclusive, and hence its operation will not be repeated here.

It is understood that wherever metal closure members are referred to, stiff paper may be used instead, and, similarly, the bowl described with reference to the FIGS. 1 and 7 forms may be made from transparent plastic as well as from glass.

In each of the forms illustrated above, a filter element of maximum efficiency has been devised by virtue of the planar arrangement of the folds of the filter element. A given flow through the filter assembly of the present invention requires a smaller filter element than do the filter assemblies of the prior art wherein the filter elements are cylindrical in form. The housing of the assembly of the present invention is permanently connected into the fuel line and need not be disturbed when a filter element is changed.

It may also be noted that in each of the forms illustrated, a portion of the housing (26 FIG. 1) extends into the bowl. When the bowl is removed, the volume occupied by the inwardly extending portion of the housing becomes available for the fluid remaining in the upper part of the housing, so that the bowl can be removed from the housing without causing any spillage of fluid from the housing. This is particularly advantageous in the form wherein the filter element remains in the bowl when the latter is removed.

It is understood further that the foregoing description refers to preferred embodiments of the invention, and that the scope of the invention therefore is not to be limited thereto, but is to be determined by the appended claims.

I claim:

1. A filter assembly comprising a housing having inlet and outlet openings, a first chamber open to atmosphere and communicating with the inlet opening, and a second chamber open to atmosphere and connected to the outlet opening, said second chamber including a vertically disposed opening, a filter element closing the vertically disposed opening to the inlet chamber, said filter element comprising a pair of sections of pleated porous material extending upwardly from a common connecting section of porous material, a rigid closure member embracing the sides and top of the pleated sections and extending to opposite sides of the common connecting section, means effecting a fluid-tight seal between the filter element and closure member, said closure member having an opening in communication with the vertically disposed opening in the second chamber, means for effecting a seal between the closure member and housing around the opening in the said second chamber, and a bowl enclosing the filter element and removably secured to the housing, a portion of said housing extending into the bowl and said portion displacing substantially the same volume of fluid as is contained in said first and second chambers.

2. A filter assembly as described in claim 1, said closure member having resilient tabs formed at the ends thereof adjacent the opposite sides of the common connecting section and extending from the said closure member into contact with the bowl to urge said closure member against the housing.

3. A filter assembly as described in claim 1, said closure member having tabs formed at the ends thereof extending under the common connecting section to hold the filter element and closure member in assembled relation.

4. A filter assembly as described in claim 1, said closure member being constructed of a single piece of metal and having spaced pairs of tabs formed at the ends thereof extending under the common connecting section to hold the filter element and closure member in assembled relation and a resilient tab formed between each pair of spaced tabs and extending from the said closure member into contact with the bowl to urge said closure member against the housing.

5. A filter assembly as described in claim 1, said filter assembly comprising further interfitting means on the housing and filter element for locating the opening in the closure member relative to the opening in the second chamber.

6. A filter assembly as described in claim 1, said filter assembly comprising further a tube on the closure member extending into the opening in the second chamber and locating the opening in the closure member relative to the opening in the second chamber.

7. A filter assembly as described in claim 1, and a rigid insert extending across the space between the said pair of sections of pleated porous material and received between folds of said pair of sections, the folds overlying the insert, and means adhering the insert to the overlying folds.

References Cited by the Examiner

UNITED STATES PATENTS

| 907,636 | 12/08 | Nutz | 210—444 |
| 2,635,174 | 4/53 | Kasten | 210—444 X |
| 2,926,787 | 3/60 | Combest | 210—444 X |

FOREIGN PATENTS

| 1,133,574 | 11/56 | France. |
| 781,864 | 8/57 | Great Britain. |

REUBEN FRIEDMAN, *Primary Examiner.*

HARRY B. THORNTON, HERBERT L. MARTIN, *Examiners.*